United States Patent
Kimmelmann et al.

(10) Patent No.: US 8,184,516 B2
(45) Date of Patent: May 22, 2012

(54) METHOD FOR CONTROLLING THE QUALITY OF STORAGE MEDIA

(75) Inventors: Stefan Kimmelmann, VS-Pfaffenweiler (DE); Hartmut Richter, Villingen-Schwenningen (DE); Atols Kern, Villingen-Schwenningen (DE); Xavier Lebegue, Jouy-en-Josas (FR); Emmanuel Daugeras, Chaville (FR)

(73) Assignee: Thomson Licensing, Issy-les-Moulineaux (FR)

(*) Notice: Subject to any disclaimer, the term of this patent is extended or adjusted under 35 U.S.C. 154(b) by 507 days.

(21) Appl. No.: 12/223,433

(22) PCT Filed: Jan. 9, 2007

(86) PCT No.: PCT/EP2007/050165
§ 371 (c)(1), (2), (4) Date: Dec. 3, 2008

(87) PCT Pub. No.: WO2007/088091
PCT Pub. Date: Aug. 9, 2007

(65) Prior Publication Data
US 2009/0180369 A1      Jul. 16, 2009

(30) Foreign Application Priority Data
Feb. 2, 2006 (EP) .................................... 06300102

(51) Int. Cl.
*G11B 27/36* (2006.01)
*G11B 7/00* (2006.01)

(52) U.S. Cl. ............. 369/53.44; 369/124.15; 369/53.35; 369/53.34

(58) Field of Classification Search ............... 369/53.35, 369/53.36, 53.34, 53.31, 53.15, 53.16, 44.29, 369/47.53, 53.2, 124.15, 44.32, 53.44, 124.14
See application file for complete search history.

(56) References Cited

U.S. PATENT DOCUMENTS

| | | | | |
|---|---|---|---|---|
| 5,848,036 A * | 12/1998 | Ishibashi et al. | ........... | 369/44.29 |
| 6,381,710 B1 * | 4/2002 | Kim | ............................... | 714/45 |
| 6,611,481 B1 * | 8/2003 | Koishi et al. | ............... | 369/47.53 |
| 7,194,364 B1 * | 3/2007 | Stanley | ........................ | 369/53.1 |
| 7,821,907 B2 * | 10/2010 | Kim et al. | .................... | 369/53.2 |
| 2002/0001266 A1 * | 1/2002 | Tateishi et al. | ............. | 369/53.32 |
| 2003/0043713 A1 * | 3/2003 | Takeda | ....................... | 369/53.33 |
| 2003/0149918 A1 * | 8/2003 | Takaichi | ........................ | 714/42 |

(Continued)

FOREIGN PATENT DOCUMENTS

JP          2-141964          5/1990

OTHER PUBLICATIONS

Patent Abstracts of Japan, vol. 014, No. 381, Aug. 16, 1990, & JP 02-141964 (See Ref. AA).

(Continued)

*Primary Examiner* — Thang Tran
(74) *Attorney, Agent, or Firm* — Myers Wolin, LLC

(57) ABSTRACT

A method for controlling the quality of storage media, and more specifically a method for determining if the quality of a storage medium decreases. The method includes: determining one or more quality parameters of the storage medium; and comparing one or more of the determined quality parameters with previously determined quality parameters of the storage medium stored in a memory in case the quality of the storage medium has been determined before.

11 Claims, 2 Drawing Sheets

U.S. PATENT DOCUMENTS

Figure 1:
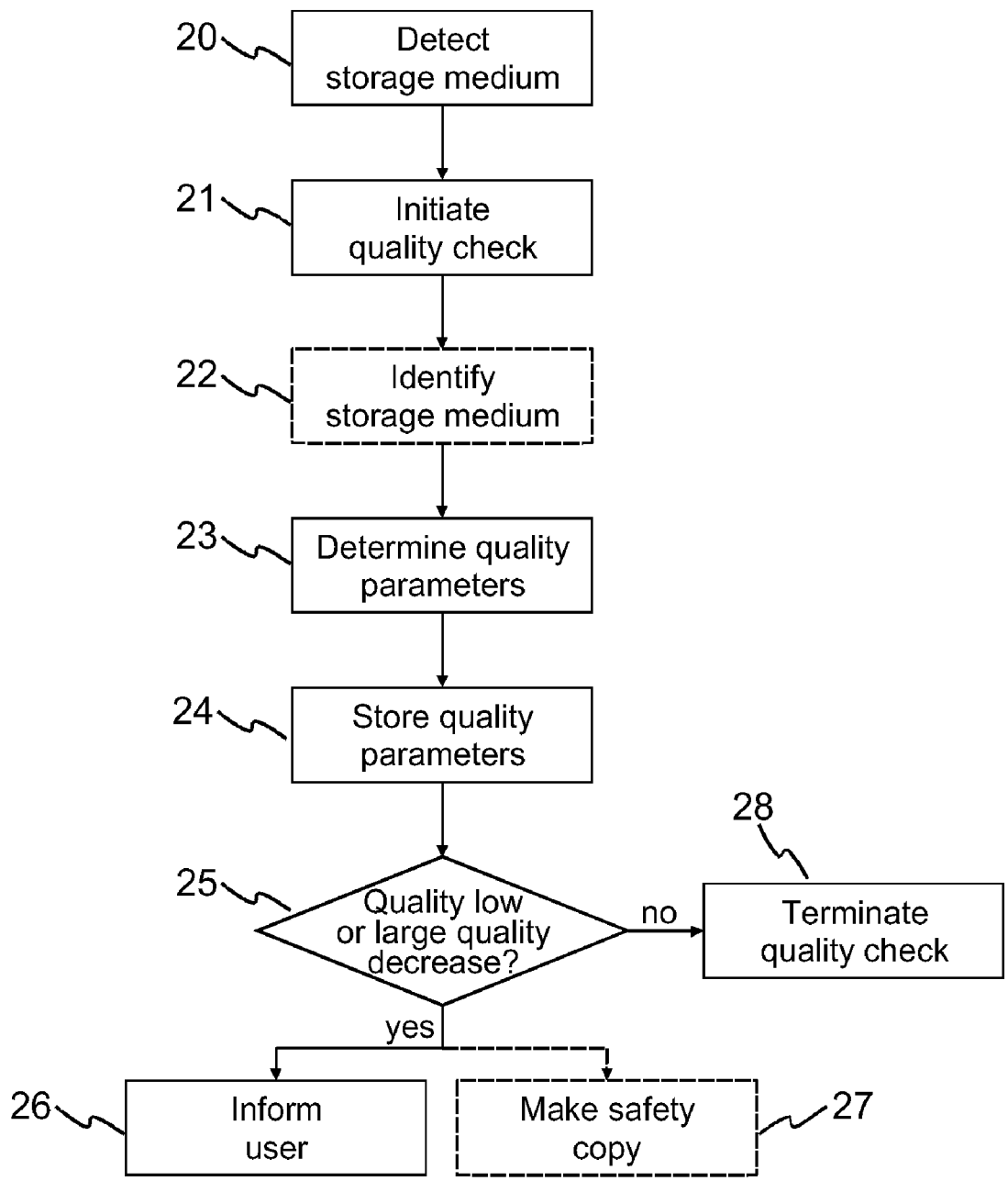

| | | | |
|---|---|---|---|
| 2003/0227845 A1* | 12/2003 | Park et al. | 369/53.19 |
| 2004/0066716 A1* | 4/2004 | Yu | 369/44.29 |
| 2004/0223433 A1* | 11/2004 | Yamada et al. | 369/53.35 |
| 2004/0246864 A1* | 12/2004 | Kobayashi et al. | 369/53.31 |
| 2005/0058040 A1* | 3/2005 | Seo et al. | 369/53.13 |
| 2005/0073929 A1* | 4/2005 | Mutou | 369/53.35 |
| 2005/0111328 A1* | 5/2005 | Potyrailo et al. | 369/53.25 |
| 2005/0157620 A1* | 7/2005 | Narumi et al. | 369/47.53 |
| 2005/0276194 A1* | 12/2005 | Kim et al. | 369/53.15 |
| 2006/0007828 A1* | 1/2006 | Kadowaki et al. | 369/53.12 |
| 2006/0023595 A1* | 2/2006 | Erickson et al. | 369/53.2 |
| 2007/0008841 A1* | 1/2007 | Seo et al. | 369/53.12 |
| 2007/0297303 A1* | 12/2007 | Yamada et al. | 369/44.36 |
| 2008/0298194 A1* | 12/2008 | Wada et al. | 369/53.34 |
| 2009/0034384 A1* | 2/2009 | Geelen | 369/53.35 |

OTHER PUBLICATIONS

Search Report Dated March 12, 2007.

\* cited by examiner

METHOD FOR CONTROLLING THE QUALITY OF STORAGE MEDIA

This application claims the benefit, under 35 U.S.C. §365 of International Application PCT/EP2007/050165, filed Jan. 9, 2007, which was published in accordance with PCT Article 21(2) on Aug. 9, 2007 in English and which claims the benefit of European patent application No. 06300102.8, filed Feb. 2, 2006.

TITLE OF THE INVENTION

The present invention relates to a method for controlling the quality of storage media, and more specifically to a method for determining if the quality of a storage medium decreases.

BACKGROUND OF THE INVENTION

It is known that today's storage media like optical storage media or hard disks change their behavior over the years, e.g. due to aging, temperature differences, or in the case of rewritable storage media, due to multiple read/write cycles. Apart from these effects, the reading performance is also reduced through damage of the storage media, e.g. scratches and/or fingerprints in the case of optical storage media. In the worst case these effects result in the loss of the whole data on such a storage medium. Therefore, it is of high importance to detect a decrease of the quality of a storage medium early enough to transfer the recorded data to a new storage medium.

For this purpose, when archiving important information on recordable DVDs, professionals use dedicated testers to measure the amount of error correction needed to read a recorded DVD. The measured quality parameters are entered into a database, which is archived as well. After a few years some of the DVDs are sampled, i.e. the quality is measured again and compared with the previously measured parameters. This allows to determine how quickly the DVDs are deteriorating. The advantage of using a DVD as a long-term storage medium is its widespread format, ensuring that readers will still exist decades from now. The drawback is its unpredictable durability. A drawback of the independent database for recording the quality parameters is that it is proprietary. Therefore, it is questionable whether it will be usable after many years.

In a different environment, high-speed DVD recorders are emerging on the market for professional and semi-professional applications, e.g. for storing multimedia content such as audio and video data, or software, on demand on a DVD. The quality of the recording is paramount in such applications, as it translates directly into a better playability, i.e. the percentage of legacy players capable to read the recorded DVD, and better longevity, i.e. the number of years that the DVD is readable without exceeding the capability of its built-in error correction mechanism. Therefore, also for such applications it is advantageous to detect a deterioration of the storage medium.

Even in consumer applications it may be desirable to check if important recordings are deteriorating. Software tools are available for analyzing a storage medium with respect to the error rate. For example, after recording an optical disk such a tool can be used for checking if there are enough margins for playability. In addition, commercial recording software often offers verify functions, which can be used for this purpose. In addition, some consumer electronics devices already have the capability to inform a user about the error rate. For example, EP 0 073 519 discloses an optical disk player, which during playback automatically determines the error rate of the disk and indicates the error rate to the user. However, as for less professional users an independent database for recording the determined quality parameters is not a realistic way to verify the condition of a storage medium, the user has no convenient possibility to monitor the degradation of a storage medium.

BRIEF SUMMARY OF THE INVENTION

It is an object of the invention to propose a method for controlling the quality of a storage medium, which allows to conveniently monitor the degradation of a storage medium.

According to the invention, this object is achieved by a method having the steps of:
 determining one or more quality parameters of the storage medium; and
 comparing one or more of the determined quality parameters with previously determined quality parameters of the storage medium stored in a memory in case the quality of the storage medium has been determined before.

According to a further aspect of the invention, an apparatus for reading from and/or writing to storage media includes:
 an analyzer for determining one or more quality parameters of the storage medium; and
 a comparing unit for comparing one or more of the determined quality parameters with previously determined quality parameters of the storage medium stored in a memory in case the quality of the storage medium has been determined before.

The invention is based on the idea that when a storage medium is used a quality check may be initiated, either automatically or upon a user request. Preferably, during recording the surface of the storage medium is analyzed, whereas during playback the surface of the storage medium and the quality of the data are analyzed. A quality check can also be started immediately after recording. During an initial quality check at least one of the determined quality parameters is stored in a memory. When the same storage medium is used again, a further quality check can be initiated. According to one possibility, this further quality check is initiated automatically, e.g. each time the storage medium is used, or only when a certain amount of time has passed since the last quality check. Alternatively, the further quality check is only initiated upon a user request. For example, a user may want to only check the quality every few years on a sampling basis, or only if he is in doubt about the quality of the storage medium. In any case, the quality parameters determined during later quality checks are compared with one or more of the previously determined quality parameters stored in the memory in order to detect a deterioration of the quality. The new measurement results are then preferably added to the already existing information in the memory. It is likewise possible to keep only the first and/or the newest (or the first and/or newest couple of) measurement results as a reference. In all cases this allows a comparison of the older and newer measurement results in order to find out if the readout quality has decreased. When the quality falls below a predefined quality limit the user is preferably automatically informed that the quality is becoming critical. For this purpose an indicator is advantageously provided. In this case the user can save the content on a new storage medium before the original storage medium is completely unreadable and the data are lost. Alternatively, instead of or in addition to alerting the user, a safety copy may automatically be generated when the quality falls below the predefined limit. Furthermore, as a large change (decrease) of the quality in a short time indicates that the quality is likely to become crucial in the near future, though the currently determined quality is still above the quality limit, preferably a safety copy is also made and/or the user is also informed when the change of the quality exceeds a predefined quality change limit. Most of the necessary information to indicate the quality of the storage medium are already accessible in current apparatuses for reading from and/or writing to storage media. Therefore, the invention can be implemented without significant additional cost. Generally, to add this feature only a firmware change is necessary.

Preferably, the memory is included in the apparatus for reading from and/or writing to the storage medium. In this case the storage medium is at first identified by an identification block before the measurement begins. The data stored for each storage medium generally includes a name or identifier of the storage medium and the measurement results of the quality check, e.g. the error rate, and/or in case of optical storage media, a focus/track error and/or a reflectivity average value.

Alternatively or in addition, the memory is included in the storage medium. This is achieved either by providing a dedicated memory on the storage medium, or in case of a recordable storage medium by using a fraction of the available recording area as the memory. Both cases have the advantage that a deterioration of the storage medium can be traced even if the storage medium is read by different apparatuses. A further advantage is that, if the parameters indicating the quality are stored directly on the storage medium, they can be compared even years later with a new measurement to determine if the storage medium is aging.

On an optical storage medium such as a DVD, the memory area for the quality parameters is preferably part of the lead-in area, for instance in the "Drive Specific Information" zone reserved in the DVD+R specification (ECMA-349: Data Interchange on 120 mm and 80 mm Optical Disk using +R Format—Capacity: 4.7 and 1.46 Gbytes per Side; Clause 17.5). For future media formats, the list and formatting of parameters may be specified in a standard for interchangeability and future-proofing. Alternatively, they may be manufacturer-specific.

Exemplary parameters that may be recorded include:
The list and format of the remaining parameters (type of data, binary encoded, XML . . . )
The date of manufacturing of the storage medium
The date before which the storage medium should be recorded and finalized
The date of recording of the storage medium
Recording parameters such as speed, write strategy parameters, make and model of recorder
Quality of the recording as measured immediately after recording, using
error-correction measures (inner and outer correction rates, uncorrectables)
jitter information (summary or detailed by 3T, 4T, etc)
user-friendly composite parameters such as expected lifetime, overall quality index, date for next quality check, dust and fingerprint indices, flatness index, laser-rot index, etc
or other parameters
The method for measuring disk recording quality, so as to be able to reproduce in the future the same conditions of measurement.

For a better understanding the invention shall now be explained in more detail in the following description with reference to the figures. It is understood that the invention is not limited to this exemplary embodiment and that specified features can also expediently be combined and/or modified without departing from the scope of the present invention. In the figures:

BRIEF DESCRIPTION OF THE SEVERAL VIEWS OF THE DRAWING(S)

Figure 2:
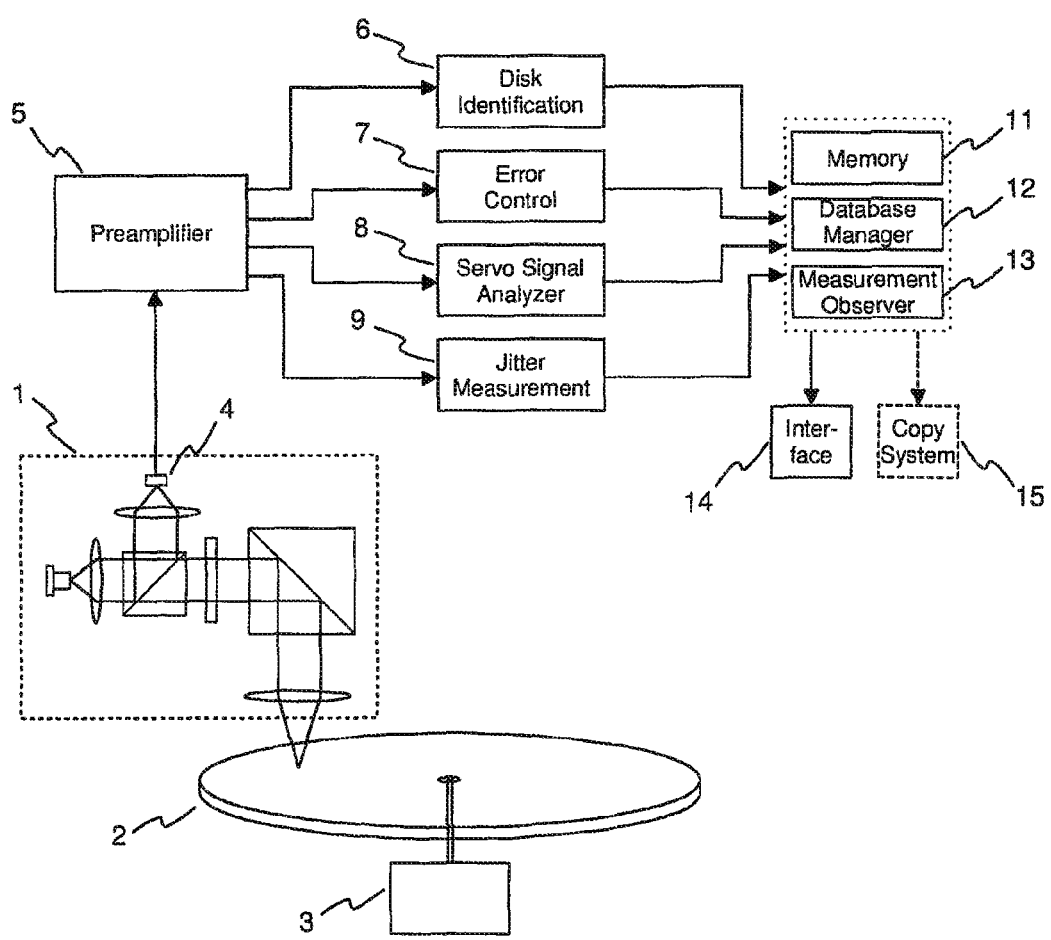

FIG. 1 shows a flow chart of a method according to the invention, and
FIG. 2 illustrates an apparatus for reading from and/or writing to optical storage media according to the invention.

DETAILED DESCRIPTION OF THE INVENTION

In FIG. 1 a method according to the invention is schematically depicted. When the presence of a storage medium is detected 20, and provided a quality check is initiated 21, the storage medium is identified 22 and one or more quality parameters are determined 23. At least some of the quality parameters are then stored 24 in a memory. It is then checked 25 if the quality has fallen below a predefined quality limit, or if the change of the quality exceeds a predefined quality change limit. In both cases a corresponding indication is given 26 to a user. Alternatively or in addition, a safety copy of the storage medium is made 27. Otherwise the method is terminated 28. The step of storing 24 the quality parameters does not have to be performed each time a quality check is performed. It is likewise possible to only store the quality parameters of an initial quality check. In addition, the step of identifying 22 the storage medium can be omitted when the quality parameters are only stored on the storage medium.

An apparatus for reading from and/or writing to optical storage media according to the invention is schematically illustrated in FIG. 2. Of course, the method according to the invention is likewise applicable to other types of fixed or removable storage media, e.g. magnetic media such as tapes, hard disks, storage cards etc. The apparatus has an optical pickup 1 for reading data from or writing data to an optical disk 2. The disk 2 is rotated by a motor 3. Information recorded on the disk 2 is accessible at a detector 4 of the pickup 1 as soon as a light spot generated by the pickup 1 is focused on one track of the disk 2. A preamplifier 5 is connected to the detector 4 and generates all signals necessary for further servo and channel processing. There are different possibilities to value the quality of the disk 2. A distinction is advantageously made between mechanical changes caused by scratches or fingerprints, and aging effects. For the mechanical defects the servo signals such as the focus error signal or the reflectivity signal are used to evaluate the changes of the performance. Aging effects caused e.g. by an elevated storage temperature or direct sunlight will also result in increasing of the jitter or the error rate.

In case the measurement results are stored in a memory 11 of the apparatus, each disk 2 has to be recognized after loading by a disk identification block 6 before an automatic measurement tool starts with the quality measurement operation. A database manager 12 creates an internal memory folder within the memory 11 for every new identified disk 2. In the case that a disk 2 is identified and already has an entry in the memory 11 it is sufficient to add the new measurement data to this entry. Though a complete measurement history of each disk 2 may be stored in the memory 11, it is sufficient to keep only the latest measurement results in the memory 11. This allows to reduce the necessary size of the memory.

If the measurement results are stored directly on the disk 2, the disk identification block 6, the memory 11 and the database manager 12 are not necessary. In this case previous measurement results are read from the disk 2 for comparison with the current measurement results.

By reading data from and/or writing data to the disk, the quality is measured by an error control block 7, a servo signal analyzer 8, and/or an internal jitter measurement block 9. Every measurement block 7, 8, 9 delivers representative quality parameters about the evaluated disk. At least some of the measurement results are stored in the dedicated disk folder of the measurement memory 11 or on the disk 2. In addition, further data may be added to the measurement results, e.g. information about the measurement conditions or an estimation of the remaining disk lifetime.

A measurement observer 13 compares the measurement results with previous results, either from the memory 11 or from the disk 2. If there is a remarkable change between the old and the new measurement results, i.e. a change exceeding a predefined threshold, there is an increased risk that the data on this disk could be lost in the near future. In this case the user is informed through a user warning interface 14. The user warning interface may include a display on the apparatus or a PC or TV screen connected to the apparatus. Also an audio warning using a loudspeaker may be employed. The warning allows the user to decide whether he wants to copy the information on this disk to a new storage medium or not. In addition to or instead of the user warning a copy system 15 can be used to automatically make a safety copy of the storage medium.

The invention claimed is:

1. A method for detecting deterioration of a storage medium, the method comprising:
    determining a jitter value of data recorded on the storage medium;
    comparing the determined jitter value with a previously determined jitter value of the data recorded on the storage medium stored in a memory;
    determining a temporal rate of change of the jitter value based on the comparing the determined jitter value with the previously determined jitter value;
    comparing the temporal rate of change of the jitter value with a predetermined threshold; and
    signalling a deterioration of the storage medium when the temporal rate of change of the jitter value exceeds the predetermined threshold.

2. The method according to claim 1, further comprising storing the determined jitter value in a memory.

3. The method according to claim 1, further comprising making a safety copy of the storage medium when the temporal rate of change of the jitter value exceeds the predetermined threshold.

4. The method according to claim 1, further comprising calculating a composite quality parameter from the temporal rate of change of the jitter value, the composite quality parameter comprising one of: an expected lifetime, an overall quality index, a date for a next quality check, or dust or fingerprint indices.

5. The method according to claim 1, wherein the memory is a part of the storage medium or a memory independent of the storage medium.

6. The method according to claim 1, wherein additional information is stored in the memory, including at least one of:
    a list and the format of the remaining parameters;
    the date of manufacturing of the storage medium;
    the date before which the storage medium should be recorded and finalized;
    the date of recording of the storage medium;
    recording parameters including at least one of speed, write strategy parameters, make and model of recorder; and
    the method used for measuring the jitter value.

7. An apparatus for reading from or writing to storage media, the apparatus comprising:
    an analyzer for determining a jitter value of data recorded on the storage medium;
    a comparing unit for comparing the determined jitter value with a previously determined jitter value of the data recorded on the storage medium stored in a memory;
    a measurement observer for determining a temporal rate of change of the jitter value based on the comparing the determined jitter value with the previously determined jitter value and for comparing the temporal rate of change with a predetermined threshold; and
    a user warning interface for signalling a deterioration of the storage medium when the temporal rate of change of the jitter value exceeds the predetermined threshold.

8. The apparatus according to claim 7, further comprising a unit for storing the determined jitter value in a memory.

9. The apparatus according to claim 7, further comprising a copy system for making a safety copy of the storage medium when the temporal rate of change of the jitter value exceeds the predetermined threshold.

10. The apparatus according to claim 7, wherein the memory is a part of the storage medium or a memory independent of the storage medium.

11. The apparatus according to claim 7, wherein additional information is stored in the memory, including at least one of:
    a list and the format of the remaining parameters;
    the date of manufacturing of the storage medium;
    the date before which the storage medium should be recorded and finalized;
    the date of recording of the storage medium;
    recording parameters including at least one of speed, write strategy parameters, make and model of recorder; and
    the method used for measuring the jitter value.

* * * * *